United States Patent

Hiorns

[11] Patent Number: 5,882,396
[45] Date of Patent: Mar. 16, 1999

[54] PIGMENTS FOR PAPER COATING COMPOSITIONS

[75] Inventor: Anthony Gordon Hiorns, Cornwall, United Kingdom

[73] Assignee: ECC International Ltd., United Kingdom

[21] Appl. No.: 740,529

[22] Filed: Oct. 30, 1996

[30] Foreign Application Priority Data

Oct. 31, 1995 [GB] United Kingdom ............... 9522228

[51] Int. Cl.$^6$ .................. C09C 1/02; C09C 1/42; C09D 1/00
[52] U.S. Cl. .................. 106/464; 106/400; 106/461; 106/465; 106/469; 106/486; 106/487; 106/468; 162/181.1; 162/181.6; 162/181.3; 162/181.8
[58] Field of Search .................. 106/461, 464, 106/463, 468, 469, 486, 487, 400, 465, 501.1; 162/181.1, 181.8, 181.3, 183, 181.6

[56] References Cited

U.S. PATENT DOCUMENTS

| | | | |
|---|---|---|---|
| 4,154,899 | 5/1979 | Hershey | 428/537 |
| 4,196,012 | 4/1980 | Windle | 106/137 |
| 4,898,620 | 2/1990 | Rayfield et al. | 106/464 |
| 5,007,964 | 4/1991 | Tsukisaka et al. | 106/464 |
| 5,120,365 | 6/1992 | Kogler | 106/464 |
| 5,151,124 | 9/1992 | Rice | 106/464 |
| 5,236,989 | 8/1993 | Brown et al. | 106/464 |
| 5,458,680 | 10/1995 | Shurling, Jr. et al. | 106/464 |

FOREIGN PATENT DOCUMENTS

| | | |
|---|---|---|
| 498421 | 1/1939 | United Kingdom . |
| 1223414 | 2/1971 | United Kingdom . |
| 1253603 | 11/1971 | United Kingdom . |
| 1364105 | 8/1974 | United Kingdom . |
| 2179956 | 3/1987 | United Kingdom . |
| 2277743 | 9/1994 | United Kingdom . |

Primary Examiner—Michael Marcheschi
Attorney, Agent, or Firm—Suzanne Kikel

[57] ABSTRACT

An inorganic particulate material suitable for use as a pigment material in a paper coating composition has a particle size distribution which when represented as a graph of percentage of weight of particles having an equivalent spherical diameter (esd) of given size versus particle esd expressed in microns and plotted on a logarithmic base 10 scale has the following features: (a) a first peak at the coarse particle size and a second peak at a finer particle size and a dip or trough between the first and second peaks; (b) the mean particle size $\bar{x}_1$ of the particles making up the first peak being 2 to 4 microns; (c) the relationship between the first and second peaks being such that the value of the mean particle size $\bar{x}_2$ of the particles making up the second peak is separated in the particle size distribution graph from the value of $\bar{x}_1$ by at least 0.5; and (d) the minimum of the dip or trough is at a given particle esd dimension of between 0.5 and 5 microns. The material may be obtained by mixing in suitable amounts a coarse pigment material and a fine pigment material having individually the appropriate particle size distributions. The coarse and fine pigments may be calcium carbonate. The fine material may also contain kaolin.

15 Claims, 1 Drawing Sheet

PIGMENTS FOR PAPER COATING COMPOSITIONS

The present invention relates to paper coating compositions and pigments for use in such compositions.

Problems have been experienced with processes for the preparation, and the use as a substrate for printing, of various types of coated paper. The present invention is concerned with providing improved paper coating compositions for use in these various types of application. The first type of coated paper with which this invention is concerned is that which is intended for use as a substrate for ink jet printing. Conventionally, ink jet printers use a water-based ink. A typical ink contains about 5% by weight of pigment, about 80% by weight of water and about 15% by weight of ethanol. Often the weight of ink deposited per unit area of the paper in ink jet printing is relatively large, and may be as high as about 25 g.m$^{-2}$. These two factors combine to make it necessary that a coated paper intended for ink jet printing must be very absorbent. Ideally, the ink pigment should remain close to the surface of the paper to give a printed image of good density, while the aqueous medium is absorbed into the body of the paper to accelerate setting and drying of the ink. Coated ink jet papers which are currently available are generally provided with a coating in which the pigment is a finely divided silica which may have a specific surface area as high as 350 m$^2$.g$^{-1}$. Such silica pigments are very expensive to produce, and generally require the use of a specialised adhesive, such as poly(vinyl alcohol). The resultant cost of the coated paper is very high, often as much as ten times the cost of a conventional copier paper.

A second type of coated paper with which this invention is concerned is that which has a matt surface. It is often considered advantageous to print on a matt surfaced paper, especially by the offset process, because by so doing it is possible to obtain a marked contrast between a glossy printed image and a dull background surface. This contrast is said to give the printed image "snap". However, certain problems have been found to be associated with the use of matt coated papers. It is conventional to use a relatively coarse pigment in the coating composition to produce a matt coated paper, but coarse pigments usually contain a proportion of hard and abrasive particles and, as a result, the coated paper can cause unacceptable abrasion of the printing form. Also, matt coated papers are often found to acquire indelible marks through scuffing during normal handling.

A third type of paper with which this invention is advantageous is coated newsprint. Cold setting inks, which are oil-based, and which never completely dry, are generally used in printing newspapers, and hitherto it has not been possible to print with this type of ink onto coated newsprint without extreme care. The ink is generally absorbed only slowly into the coated surface, and unacceptable offset of the printed image tends to occur. For this reason, very little coated newsprint is used.

The present invention is concerned with reducing the problems described above by use in a paper coating composition of an inorganic particulate material which has a novel particle size distribution comprising two peaks having certain specified features.

Such a material may be formed by mixing together two or more materials having particle size distributions constituting the individual peaks. Various compositions for paper coating are described in the prior art by mixing together inorganic particulate materials having different particle size distribution, eg. as in U.S. Pat. No. 5120365, GB 1223414, GB 2277743A, U.S. Pat. No. 4196012, GB 1364105, GB 2179956A and GB 1253603. However, none of these references describes compositions having the novel particle size distribution specified herein and therefore none teaches ways in which the above problems may be substantially reduced. There remains a need for an inorganic particulate material having properties such that a paper coating composition incorporating the same will have improved properties whereby the aforementioned problems are reduced.

According to the present invention in a first aspect there is provided an inorganic particulate material suitable for use as a pigment material in a paper coating composition which particulate material has a particle size distribution which when represented as a graph of percentage by weight of particles having an equivalent spherical diameter (esd) defined hereinafter of given size versus particle esd expressed in microns (micrometres) and plotted on a logarithmic base 10 scale has the following features:

(a) a first peak at a coarse particle size and a second peak at a finer particle size and a dip or trough between the first and second peaks, the mean particle size $x_1$ of the particles making up the first peak being in the range 2 microns to 4 microns; and (b) the relationship between the said first and second peaks being such that the value of the mean particle size $\bar{x}_2$ of the particles making up the second peak is separated in the said particle size distribution graph from the value of $\bar{x}_1$ by at least 0.5.

Expressed algebraically, $\log_{10}\bar{x}_1 - \log_{10}\bar{x}_2 \geq 0.5$. Preferably, $\log_{10}\bar{x}_1 - \log_{10}\bar{x}_2 \geq 0.6$. Examples of such a novel particle size distribution are described hereinafter.

In practice, in constructing the said graph the esd plotted logarithmically along the x-axis may be classified in esd size bands or increments. However, such a graph will approximate to one in which esd is plotted as a continuous variable. Such a graph may be constructed my measuring a standard particle size distribution curve for a given material (percentage by weight of particles less than a given esd) and extracting data for percentage of particles in given esd increments from the curve. The esd increments may increase logarithmically as esd increases.

Preferably, the said first and second peaks each have at a height which is one half of the maximum value of the peak a width measured along the esd (x-) axis plotted in microns on a logarithmic scale a value of less than 1.0.

The said first and second peaks may respectively be made up by the same or different particulate materials. Desirably, the inorganic particulate material making up the first peak comprises a compound of an inorganic alkaline earth metal, especially calcium carbonate or dolomite. Calcium carbonate may be either ground material obtained from natural mineral sources or precipitated material produced synthetically. Preferably, the material comprises ground calcium carbonate preferably having an aspect ratio, ie. particulate length to average diameter ratio, of at least 5 to 1. Such a material has suitable whiteness.

The inorganic particulate material making up the second peak may be selected from one or more of kaolin, metakaolin, calcium carbonate (ground or precipitated), calcium sulphate, mica and titanium dioxide. For paper for ink jet printing as described below calcium carbonate is preferred as the said material.

Examples of materials which have a particle size distribution specified above may be given as follows.

The present Applicant/Assignee company produces various pigment products including nine products which may be referred to as Products 1 to 9. Each of the Products 1 to 9 has a particle size distribution which reaches a given peak. Table 1 as follows gives the mean particle size by weight x for each of Products 1 to 9 and the value of $\log_{10}x$ for each Product.

TABLE 1

| Product No. | Value of x(μm) | Value of $\log_{10}x$ |
|---|---|---|
| 1 | 2.8 | 0.45 |
| 2 | 2.5 | 0.40 |
| 3 | 2 | 0.30 |
| 4 | 1.5 | 0.18 |
| 5 | 1.0 | 0.0 |
| 6 | 0.63 | −0.17 |
| 7 | 0.54 | −0.27 |
| 8 | 0.44 | −0.36 |
| 9 | 0.20 | −0.70 |

A material in accordance with the first aspect of the present invention may be prepared by mixing together two different products having appropriate different particle size distributions and different x values. Of the Products listed in Table 1, only Products 1 to 3 may be used to give the first peak having a mean particle size $x_1$ since $x_1$ in a material according to the first aspect of the present invention must be in the range 2 μm to 4 μm. Considering therefore mixtures containing Product No. 1 first, the difference $\Delta(\log_{10}x)$ between the value of $\log_{10}x$ for this Product and the value of $\log_{10}x$ for the other Product is shown in Table 2 as follows.

TABLE 2

Value of $\Delta(\log_{10}x)$ For Mixtures Containing Product 1

| Product No. which is an Additive to Product 1 | Value of $\Delta(\log_{10}x)$ |
|---|---|
| 2 | 0.05 |
| 3 | 0.15 |
| 4 | 0.27 |
| 5 | 0.45 |
| 6 | 0.61 |
| 7 | 0.71 |
| 8 | 0.80 |
| 9 | 1.15 |

The value of $\Delta(\log_{10}x)$ for a material in accordance with the first aspect of the invention must be at least 0.5 preferably at least 0.6. Thus, such a material may be formed by mixing together Product 6, 7, 8 or 9, but not Product 2, 3, 4 or 5 with Product 1.

Likewise, considering mixtures containing Product 2 and each of the other Products, the values of $\Delta(\text{lod}_{10}x)$ for the mixtures are listed in Table 3 as follows.

TABLE 3

Value of $\Delta(\log_{10}x)$ For Mixtures Containing Product 2

| Product No. which is an Additive to Product 2 | Value of $\Delta(\log_{10}x)$ |
|---|---|
| 1 | 0.05 |
| 3 | 0.10 |
| 4 | 0.22 |
| 5 | 0.40 |
| 6 | 0.57 |
| 7 | 0.67 |
| 8 | 0.75 |
| 9 | 1.10 |

Table 3 shows that the Products which when mixed with Product 2 give $\Delta(\log_{10}x) \geq 0.5$ are Products 6 to 9. Products 7 to 9 are especially suitable since $\Delta(\log_{10}ox) \geq 0.6$. Products 1 and 3 to 5 do not give suitable mixtures with Product 2.

Similarly, considering mixtures containing Product 3, and each of the other Products, the values of $\Delta(\log_{10}x)$ for the mixtures are listed in Table 4 as follows.

TABLE 4

Value of $\Delta(\log_{10}x)$ For Mixtures containing Product 3

| Product No. which is an Additive to Product 2 | Value of $\Delta(\log_{10}x)$ |
|---|---|
| 1 | 0.15 |
| 2 | 0.10 |
| 4 | 0.12 |
| 5 | 0.30 |
| 6 | 0.47 |
| 7 | 0.57 |
| 8 | 0.66 |
| 9 | 1.0 |

Table 4 shows that the Products which when mixed with Product 3 give $\Delta(\text{lod}_{10}x) \geq 0.5$ are Products 7 to 9. Products 8 and 9 are especially suitable since $\Delta(\log_{10}x)$. 0.6. Products 1, 2 and 4 to 6 are not suitable.

Persons skilled in the art will recognise that a material having selected value of x may be made by mixing together two or more materials having different x values. Thus, materials embodying the first aspect of the present invention may be made by mixing together three or more materials, eg. from Product 1 to 9, to satisfy the requirements that $x_1$ is in the range 2 μm to 4 μm and $\log_{10}x_1 - \log_{10}x_2 \geq 0.5$, preferably $\geq 0.6$.

The inorganic particulate material according to the first aspect of the present invention may be formed as a composite particulate pigment composition consisting of from 1% to 99% by weight of a coarse pigment having a particle size distribution such that from 20% to 50% by weight consists of particles having an equivalent spherical diameter smaller than 2 microns (micrometres) and from 99% to 1% by weight of a fine pigment having a particle size distribution such that from 95% to 100% by weight consists of particles having an equivalent spherical diameter smaller than 2 microns.

The coarse pigment will have 80% to 50% by weight of particles having an equivalent spherical diameter equal to or greater than 2 microns. The fine pigment will have 5% to 0% by weight of particles having an equivalent spherical diameter to equal to or greater than 2 microns.

"Equivalent spherical diameter" (esd) of a particle as used herein is the diameter of a sphere of equivalent surface area to the particle as measured by sedimentation.

Desirably, the said coarse and fine pigments are such that the coarse pigment has a particle size distribution having a first peak P1 and the fine pigment has a particle size distribution having a second peak P2 and the upper envelope obtained by combining the two particle size distributions shows a dip or trough D between the two peaks. The relationship between the two peaks P1 and P2 must be such that $x_1$ for $P_1$ is between 2 μm and 4 μm and the relationship between $x_1$ for $P_1$ and $x_2$ for $P_2$ is such that $\log_{10}x - \log_{10}x_2$ is $\geq 0.5$, preferably $\geq 0.6$.

When the coarse pigment and the fine pigment are blended together the blend desirably has a combined particle size distribution B showing a first coarse peak B1, a second fine peak B2 and a dip or trough B3 between them. B1, B2 and B3 may be near to P1, P2 and D respectively.

By providing an inorganic particulate material in accordance with the first aspect of the invention, eg. obtained from coarse and fine pigments having correct particle size distributions as illustrated hereinafter the particulate material, eg. pigment composition formed by blending the coarse pigment and the fine pigment thereby, has a bimodal particle size distribution. Particles of the coarse pigment can form an open bed into which the particles of the fine pigment can loosely pack. Unexpectedly, we have found that this gives advantageous paper coating properties as described hereinafter.

If the particle size distributions of the coarse and fine pigments of the pigment composition embodying the first aspect of the present invention are plotted in a conventional manner as percentage of particles (y-axis) having an equivalent spherical diameter of less than a given dimension versus the given dimension (or bands of dimensions) on a logarithmic scale (x-axis) then the centre of the dip D is preferably near to the mid-point between the peaks P1 and P2 measured along the x axis. The distance of the minimum of D to the mid-point between the maxima of the respective peaks P1 and P2 is preferably less than 20 per cent of the distance between the maximum of the peaks P1 and P2. Preferably, the minimum of the dip D as defined is at a given dimension of between 0.5 microns (micrometres) and 1.5 microns. Preferably, the actual given dimension on the x-axis at which the first peak P1 reaches a maximum is from 0.05 to 0.5, preferably 0.1 to 0.3, times the actual given dimension on the x-axis at which the second peak P2 reaches a maximum. The first peak P1 desirably reaches a maximum at from 2.5 microns to 3.5 microns, the second peak P2 desirably reaches a maximum at from 0.2 microns to 0.8 microns and the dip D desirably reaches a maximum at from 1.0 microns to 2.0 microns, preferably 1.0 microns to 1.5 microns.

The required particle size distributions of the said coarse and fine pigments may be obtained by methods which are well known per se to those skilled in the art, eg. as discussed hereinbefore.

The said pigment composition may have a ratio by weight of coarse pigment to fine pigment in the range 1:5 to 5:1, preferably from 1:3 to 2:1, depending on the particular paper coating application.

The coarse pigment may be of the same pigment material type as the fine pigment material type or the two may be of different material types.

The particles making up the coarse pigment and the particles making up the fine pigment may each be provided by a single pigment material type or a blend of pigments of different material types.

The materials making up the coarse pigment and the fine pigment may be as specified hereinbefore.

In applications where a matt surface is required, the said fine pigment may advantageously comprise from 2 per cent to 60 per cent by weight of kaolin clay together with from 40 per cent to 98 per cent by weight of ground calcium carbonate. The coarse pigment may comprise at least 90 per cent by weight of ground calcium carbonate.

The material according to the first aspect of the present invention may be formed as an aqueous suspension. For example, the said pigment composition if employed as the material according to the first aspect of the present invention may be formed as an aqueous suspension by mixing aqueous suspensions of each of the required pigments to form an aqueous suspension incorporating the mixture of pigments. Such an aqueous suspension may be a dispersed aqueous suspension and the individual aqueous suspensions of pigments employed to form the mixture may each incorporate a dispersing agent. The dispersing agents employed to disperse the pigments in the individual aqueous suspensions mixed together, and the concentrations of such suspensions, may be the same or different.

The dispersed aqueous suspension comprising material according to the first aspect preferably contains at least 60% preferably at least 70% by dry weight of pigments and preferably has a viscosity of not more than 500 mPa.s as measured by a Brookfield Viscometer at a spindle speed of 100 revolutions per minute. The dispersing agent may be present in an amount of up to 2.0 per cent, e.g. 0.02 per cent to 1.5 per cent, by weight based upon the dry weight of pigments present.

The dispersing agent employed to disperse material according to the first aspect or either or both of the pigments of a pigment composition formed by mixing together two or more pigments may be selected from the dispersing agents known in the art for the dispersion of pigments for paper coating compositions. The dispersing agent may for example comprise a polycarboxylate which may be a homopolymer or copolymer which contains a monomer unit comprising a vinyl or olefinic group which is substituted with at least one carboxylic acid group, or a water soluble salt thereof. Examples of suitable monomers are acrylic acid, methacrylic acid, itaconic acid, crotonic acid, fumaric acid, undecylenic acic, angelic acid and hydroxyacrylic acid. By the term "water soluble salt" is meant that at least a proportion of the salt forming groups of the dispersing agent are neutralised, but it is not essential that all of the salt forming groups are neutralised. Both fully neutralised and partially neutralised polycarboxylate dispersing agents are useful. The number average molecular weight of the polycarboxylate dispersing agent should be not greater that 20,000, and preferably in the range from 700 to 10,000, as measured by the method of gel permeation chromatography using a low angle laser light scattering detector.

According to the present invention in a second aspect there is provided a paper coating composition which comprises an aqueous suspension of a material according to the first aspect of the present invention mixed together with a hydrophilic binder.

In the paper coating composition according to the present invention the binder may form from 4 per cent to 20 per cent based on the total dry weight of particulate material present. The binder may be one of the known paper coating adhesives employed in the art, e.g. chosen from the group consisting of starches, proteinaceous adhesives such as casein and latices of, for example, styrene-butadiene rubbers and acrylic polymers. The binder will be selected according to the coating application. The paper coating composition according to the second aspect of the present invention may also include a thickener, eg. in an amount of up to two per cent by weight based upon the total dry weight of pigment or pigments present. The thickener may comprise one or more substances employed as thickeners in the prior art, e.g. sodium carboxymethyl cellulose or synthetic acrylic thickeners. Other known additives may also be employed, eg. biocides, lubricants, anti-foamers, pH adjusters, rheology modifying agents and dispersing agents (as discussed above). Such additives may form less than 10%, eg. less than 7% by weight, in total of the coating composition.

The paper coating composition according to the present invention in its second aspect may be formed by mixing together an aqueous dispersed suspension of a coarse pigment and an aqueous dispersed suspension of a fine pigment together with the required adhesive together with any other optional constituents to be incorporated, eg. a thickener and one or more of the other additives. The pigment suspensions may be mixed before or during the mixture with the adhesive. The mixing with the adhesive may be carried out in a manner familiar to those skilled in the art, in a mixer until an even mixture texture is obtained.

When the paper coating composition according to the second aspect of the present invention is intended for preparing a coated paper for ink jet printing, the composite pigment composition preferably consists of from 1% to 50% by weight of the coarse pigment and from 99% to 50% of the fine pigment, and a hydrophilic polymeric adhesive is preferably used, for example starch, poly(vinyl alcohol), sodium carboxymethyl cellulose or hydroxyethyl cellulose to form the paper coating composition. A composition of this type has been found unexpectedly to make it possible to provide a coated paper which will give a printed image by ink jet printing having a quality comparable with that produced on a paper coated with a composition containing as a pigment only silica of high specific surface area, but at a fraction of the cost.

When the paper coating composition according to the second aspect of the present invention is intended for preparing a matt coated paper, the pigment composition preferably consists of from 10% to 99% by weight of the coarse pigment and from 90% to 1% by weight of the fine pigment, and the adhesive may be, for example, a styrene-butadiene rubber or an acrylic latex, starch, sodium carboxymethyl cellulose, hydroxyethyl cellulose or poly(vinyl alcohol). The use of a composition of this type has been found unexpectedly to make it possible to prepare a coated paper with a surface which itself has low gloss, but which will accept a printed image of high gloss, especially by the offset printing process. The coating is also of relatively low print abrasion, and has good resistance to marking.

When the paper coating composition is intended for preparing a coated newsprint for use with cold set inks, the pigment composition preferably consists of from 20% to 99% by weight of the coarse pigment and from 80% to 1% by weight of the fine pigment, and the adhesive may be, for example, a styrene-butadiene rubber or an acrylic latex, starch, sodium carboxymethyl cellulose, hydroxyethyl cellulose or poly(vinyl alcohol). The use of a composition of this type has been found unexpectedly to make it possible to prepare a coated newsprint which will accept a printed image of good quality using a cold set ink with a tendency to offset the image which is no worse than that experienced with commercial uncoated newsprint.

According to the present invention in a third aspect there is provided a paper which has been coated with a paper coating composition according to the second aspect of the present invention.

BRIEF DESCRIPTION OF THE DRAWING

Embodiments of the present invention will now be described by way of example with reference to the accompanying drawing in which.

Figure 1:
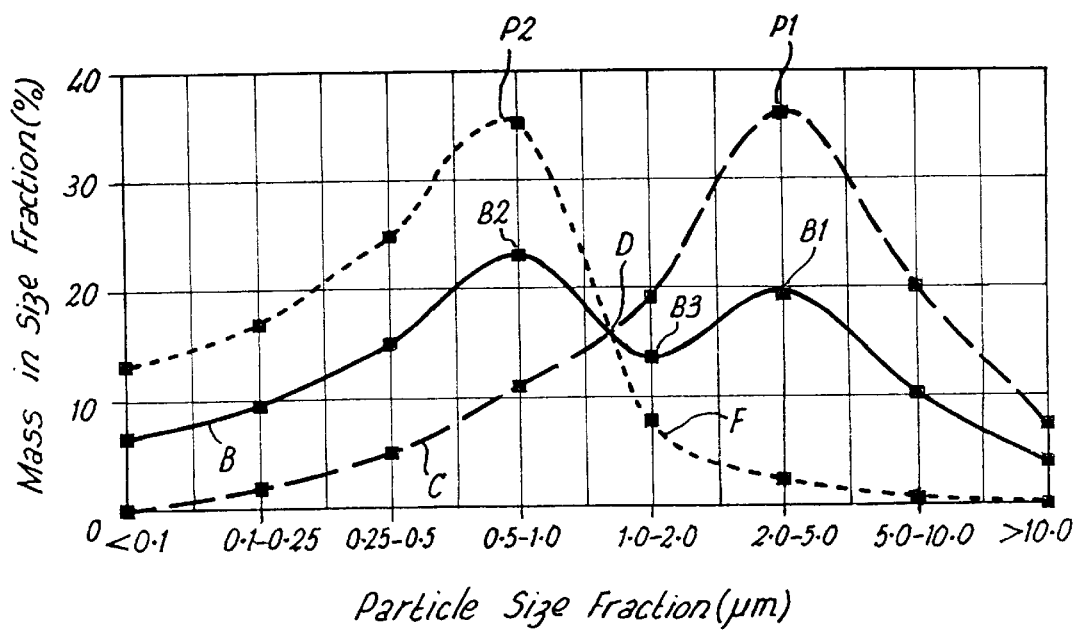
FIG. 1 is a graph illustrating the particle size distribution of a pigment composition embodying the invention.

Example 1 as follows gives an example of a pigment coating composition embodying the present invention.

EXAMPLE 1

FIG. 1 shows the particle size distribution of two calcium carbonate pigments obtained from ground marble. A first coarse pigment (Product 1 specified hereinbefore) has 35 per cent of its particles having an equivalent spherical diameter of less than 2 microns, 65 per cent having an equivalent spherical diameter of 2 microns or more. A second fine pigment (Product 8 specified hereinbefore) has 90 per cent of its particles having an equivalent spherical diameter of less than 2 microns, 10 per cent having an equivalent spherical diameter of 2 microns or more. The particle size distribution of the coarse pigment is shown as curve C and the particle size distribution of the fine pigment is shown as curve F in FIG. 1. In FIG. 1 the horizontal- or x-axis represents bands or fractions of given particle size, the median of the band or fraction increasing logarithmically in unit intervals along the scale. The peak of the size distribution of the coarse pigment is shown as P1 and the peak of the size distribution of the fine pigment is shown as P2. The upper envelope of the combined two curves C and F reaches a minimum at a point D between the two peaks P1 and P2. The coarse and fine pigments have x values, $x_1$ and $x_2$ respectively, which are close to $P_1$ and $P_2$ respectively.

The coarse pigment and the fine pigment may be blended to form a pigment blend or composition which contains 50 per cent by weight of each pigment. The particle size distribution of the blend is shown as curve B in FIG. 1. Curve B has a coarse peak B1 and a fine peak B2 and a dip B3 between them. The blend represented by curve B may be employed in paper coating applications, e.g. especially for a paper to receive a cold set ink.

Example 2 as follows describes an embodiment of the present invention concerning preparation and properties of paper coating compositions and paper coated thereby.

EXAMPLE 2

Seven paper coating compositions were prepared according to the recipes given in Table 5 below:

TABLE 5

| Composition Ingredient | A | B | C | D | E | F | G |
|---|---|---|---|---|---|---|---|
| | Parts by weight | | | | | | |
| Pigment C1 | 0 | 100 | 0 | 0 | 0 | 0 | 0 |
| Pigment C2 | 100 | 0 | 20 | 40 | 20 | 40 | 0 |
| Pigment F1 | 0 | 0 | 80 | 60 | 0 | 0 | 0 |
| Pigment F2 | 0 | 0 | 0 | 0 | 80 | 60 | 100 |
| Starch adhesive | 20 | 20 | 25 | 25 | 25 | 25 | 25 |
| Glyoxal | 0.2 | 0.2 | 0.2 | 0.2 | 0.2 | 0.2 | 0.2 |

In the above compositions in Table 5:

Pigment C1 was a relatively coarse natural chalk having a particle size distribution such that 43% by weight of the particles had an equivalent spherical diameter smaller than 2 microns. Pigment C1 is equivalent to Product 2 described above.

Pigment C2 was a relatively coarsely ground natural marble having a particle size distribution such that 40% by weight of the particles had an equivalent spherical diameter smaller than 2 microns. Pigment C2 is equivalent to Product 2.

Pigment F1 (Product 8) was a finely ground natural marble having a particle size distribution such that 99% by weight of the particles had an equivalent spherical diameter smaller than 2 microns and 90% by weight of the particles had an equivalent spherical diameter smaller than 1 micron.

Pigment F2 (Product 9) was an ultrafine kaolin clay having a particle size distribution such that 98% by weight of the particles had an equivalent spherical diameter smaller than 2 microns and 90% by weight of the particles had an equivalent spherical diameter smaller than 0.5 microns.

The starch adhesive was a product marketed by Emsland Stärke GmbH under the trade name "EMJET F4281". The glyoxal was added as an insolubiliser for the starch.

Each of the compositions was coated on to an unsized, and hence absorbent, wood-free base paper, using a pilot coating machine equipped with a Symsizer coating head using smooth metering rods and running at a speed of 800 m.min$^{-1}$. Samples of each composition were applied at various coat weights in the range from 6 to 10 g.m$^{-2}$ and the coatings were dried and the coated paper passed once through a soft calender at a speed of 800 m.min$^{-1}$, a temperature of 200° C. and a line pressure of 200 kN.m$^{-1}$.

Each sample of coated paper was printed with a standard pattern using a Hewlett Packard HP550C colour inkjet printer. The print density was measured using a Gretag D186 Reflection Densitometer without a polarisation filter for areas of the pattern which had been printed, respectively, with black (single ink black), cyan, magenta, yellow and a combination of the three colours, cyan, magenta and yellow (composite black), and the results are set forth in Table 6 below. As a comparison, the results obtained with similar tests using a commercially available copier paper and a commercially available inkjet paper coated with a composition containing as pigment only high surface area silica are also shown in Table 6.

TABLE 6

| Composition | Print Density | | | | |
|---|---|---|---|---|---|
| | Single ink black | Cyan | Magenta Black | Yellow | Composite |
| A | 0.72 | 1.02 | 0.75 | 0.56 | 0.57 |
| B | 0.68 | 0.99 | 0.73 | 0.56 | 0.59 |
| C | 1.12 | 1.30 | 0.93 | 0.70 | 0.94 |
| D | 1.25 | 1.33 | 0.95 | 0.71 | 0.98 |
| E | 0.95 | 1.15 | 0.87 | 0.64 | 0.91 |
| F | 0.96 | 1.16 | 0.86 | 0.63 | 0.90 |
| G | 0.99 | 1.15 | 0.85 | 0.62 | 0.82 |
| Copier paper | 1.30 | 0.95 | 0.75 | 0.60 | 1.00 |
| Ink Jet paper | 1.62 | 1.44 | 1.00 | 0.74 | 1.03 |

These results show that Composition D provided a coated ink jet printing paper which was comparable with the commercial ink jet paper coated with a composition containing high surface area silica in all respects except for the density of single ink black. Compositions E, F and G are not as effective as Composition D because the fine kaolin they contain interacts with the ink and this causes reduced colour absorption by the ink. Thus, it is preferred that paper for ink jet printing having a coating made from a coarse pigment and a fine pigment includes calcium carbonate as both coarse and fine pigments.

EXAMPLE 3

Further samples of the batches of paper coated with Compositions C to G, which were prepared as described in Example 2, were printed with a standard pattern by the offset printing process using a Prufbau Multipurpose Printability Tester and the printed samples were tested for print abrasion, paper sheet gloss and print gloss.

For the print abrasion test, the print produced by the Printability Tester was allowed to dry for 72 hours, and was then tested on a Prufbau Quartant Abrasion Tester, using an unprinted piece of the printed sample to receive any removed ink. The amount of ink transferred to the unprinted piece of paper was determined by measuring the reflectance (R) of the paper by means of an Elrepho Abridged Spectrophotometer fitted with Filter No. 10. The spectrophotometer was first adjusted to read 100 on a further piece of an unprinted area of the sample, and the amount of ink of transferred is given by 100-R.

The paper sheet gloss was measured by the method described in TAPPI Standard No. T480 ts-65 using a Hunterlab Glossmeter set at 75 degrees to the normal to the paper. The print gloss was also measured using the Hunterlab Glossmeter at an angle of 75 degrees to the normal.

The results are set forth in Table 7 below:

TABLE 7

| Composition | Print Abrasion | Sheet Gloss | Print Gloss | Gloss difference |
|---|---|---|---|---|
| C | 4.8 | 17 | 49 | 32 |
| D | 4.8 | 14 | 49 | 35 |
| E | 2.4 | 32 | 43 | 11 |
| F | 3.0 | 23 | 49 | 26 |
| G | 1.6 | 33 | 43 | 10 |

These results show that the paper coated with Composition D gave a difference of 35 units between print gloss and sheet gloss, while retaining an acceptable print abrasion value of less than 5.

EXAMPLE 4

Each of the compositions A to G was coated on to a newsprint base paper, using the same pilot coating machine with the same coating head under the same conditions as were described in Example 2. Samples of each composition were applied at various coat weights in the range from 6 to 10 g.m$^{-2}$ and the coatings were dried and the coated paper passed once through a soft calender at a speed of 800 m.min$^{-1}$, a temperature of 200° C. and a line pressure of 200 kN.m$^{-1}$.

Each batch of coated newsprint was subjected to an ink offset test on an IGT AIC25 Print Tester using a black offset news (non-drying) ink. The press was set to give a time delay between printing the image on to the test sheet and off-setting it on to a sheet of cast coated paper of 0.05 second. The densities of the offset images corresponding to various regions of the printed image of different print densities were measured, and graphs drawn of offset density against print density. The tests were performed on groups of coated newsprint samples having coat weights, respectively of about 6 g.m$^{-2}$ and 8 to 10 g.m$^{-2}$. From each graph the offset image density corresponding to a print density of 1.0 was determined by interpolation, and the results are set forth in Table 8 below.

As a comparison, the same tests were also performed on a commercial uncoated newsprint and on a commercial coated newsprint, which can be used with care on newsprint presses.

These results also are given in Table 8 as follows.

TABLE 8

| | Set off density for a print density of 1.0 | |
|---|---|---|
| Composition | 6 g.m$^{-2}$ | 8–10 g.m$^{-2}$ |
| A | — | 0.19 |
| B | 0.26 | 0.23 |
| C | 0.44 | 0.46 |
| D | 0.37 | 0.48 |
| E | 0.43 | 0.39 |
| E | 0.43 | 0.45 |
| G | 0.43 | 0.44 |

TABLE 8-continued

| | Set off density for a print density of 1.0 | |
|---|---|---|
| Composition | 6 g.m$^{-2}$ | 8–10 g.m$^{-2}$ |
| Uncoated newsprint | 0.36 | 0.36 |
| Coated newsprint | 0.36 | 0.36 |

These results show that it is possible, by use of composition embodying the invention, to obtain a coated newsprint which, while offering the advantages of a coated paper, such as enhanced print quality, shows a tendency to offset which is no worse than that observed with a conventional uncoated newsprint.

I claim:

1. An inorganic particulate material suitable for use as a pigment composition in a paper coating composition which particulate material comprises material selected from one or more of kaolin, calcined kaolin, dolomite, ground natural calcium carbonate, precipitated calcium carbonate, calcium sulphate or talc and has a particulate size distribution which when represented as a graph of percentage of weight of particles having an equivalent spherical diameter (esd) defined herein of given size versus particle esd expressed in microns and plotted on a logarithmic base 10 scale has the following features:
   (a) a first peak at a coarse particle size and a second peak at a finer particle size and a dip or trough between the first and second peaks; (b) the mean particle size $\bar{x}_1$ of the particles making up the first peak being in the range of from about 2 microns to about 4 microns; (c) the relationship between the said first and second peaks being such that the value of the mean particle size $\bar{x}_2$ of the particles making up the second peak is separated in the said particle size distribution graph from the value of $\bar{x}_1$ by at least 0.5; and (d) the minimum of the dip or trough is at a given particle esd dimension of between 0.5 microns and 1.5 microns.

2. An inorganic particulate material as claimed in claim 1 and which is a mixture of 1% to 99% by weight of a coarse pigment having a particle size distribution such that from 20% to 50% by weight consists of particles having an equivalent spherical diameter smaller than 2 microns and from 99% to 1% by weight of a fine pigment having a particle size distribution such that from 95% to 100% by weight consists of particles having an equivalent spherical diameter smaller than 2 microns.

3. An inorganic particulate as claimed in claim 2 and wherein the coarse pigment and the fine pigment are such that the coarse pigment has a particle size distribution having a first peak P1 and the fine pigment has a particle size distribution having a second peak P2 and an upper envelope obtained by combining the two particle size distributions has a trough or dip D between the two peaks P1 and P2 and wherein the coarse and fine pigments have particle size distributions such that the distance, along a given dimension axis when based on a logarithmic scale, from the minimum of the trough or dip D to the mid-point between the maxima of the peaks P1 and P2 is less than 20 per cent of the distance between the maxima of the peaks P1 and P2.

4. An inorganic particulate material as claimed in claim 2 and wherein the coarse and fine pigments are such that the second peak P2 reaches a maximum at a given esd dimension which is from 0.05 times to 0.5 times the given esd dimension at which the first peak reaches a maximum.

5. An inorganic particulate material as claimed in claim 2 and wherein the coarse pigment and the fine pigment are such that the first peak P1 reaches a maximum at a given esd dimension of from 2.5 microns to 3.5 microns, the second peak P2 reaches a maximum at a given esd dimension of from 0.2 microns to 0.8 microns and the trough or dip D reaches a minimum at a given esd dimension of from 1.0 micron to 2.0 microns.

6. An inorganic particulate material as claimed in claim 2 and wherein the pigment composition has a ratio of coarse pigment to fine pigment of between 1:5 to 5:1.

7. An inorganic particulate material as claimed in claim 2 and wherein the coarse pigment comprises calcium carbonate or ground dolomite and the fine pigment comprises kaolin, calcined kaolin, natural or precipitated calcium carbonate, calcium sulphate or talc.

8. A material as claimed in claim 7 and wherein at least about 90 percent by weight of the coarse pigment and at least about 40 percent by weight of the fine pigment comprises ground calcium carbonate.

9. A material as claimed in claim 8 and wherein the fine pigment also comprises from about 2 percent to about 60 percent by weight of kaolin clay.

10. A paper coating composition comprising an aqueous suspension of an inorganic particulate material together with a hydrophilic binder, the binder being present in an amount of from about 4 percent to about 20 percent by weight based on the dry weight of the inorganic particulate material, wherein the inorganic particulate material comprises a material selected from kaolin, calcined kaolin, dolomite, ground natural calcium carbonate, precipitated calcium carbonate, calcium sulphate or talc and has a particle size distribution which when represented as a graph of percentage of weight of particles having an esd defined herein of given size versus particle esd expressed in microns and plotted on a logarithmic base 10 scale has the following features; (a) a first peak at a coarse particle size and a second peak at a finer particle size and a dip or trough between the first and second peaks; (b) the mean particle size $\bar{x}_1$ of the particles making up the first peak being in the range of from about 2 microns to about 4 microns; (c) the relationship between the said first and second peaks being such that the value of the mean particle size $\bar{x}_2$ of the particles making up the second peak is separated in the said particle size distribution graph from the value of $\bar{x}_1$ by at least 0.5; and (d) the minimum of the dip or trough is at a particle esd dimension of between 0.5 microns and 1.5 microns.

11. A composition as claimed in claim 10 and wherein the binder comprises adhesive material selected from starches, or proteinaceous adhesives.

12. A paper coated with a paper coating composition as claimed in claim 10.

13. A paper as claimed in claim 12 and which is suitable for ink jet printing, the paper being coated with a coating composition which includes from 1 percent to 50 percent by weight of a coarse pigment and from 99 percent to 50 percent by weight of a fine pigment.

14. A paper as claimed in claim 12 and which is suitable for use as a matt coated paper, the paper being coated with a coating composition which includes from 10 percent to 99 percent by weight of a coarse pigment and from 90 percent to 1 percent by weight of a fine pigment.

15. A paper as claimed in claim 12 and which is suitable for use as a newsprint paper, the paper being coated with a coating composition which includes from 20 percent to 99 percent by weight of a coarse pigment and from 80 percent to 1 percent by weight of a fine pigment.

* * * * *